United States Patent
Saxena et al.

(10) Patent No.: US 9,806,942 B2
(45) Date of Patent: Oct. 31, 2017

(54) DEEP LINKING TO MOBILE APPLICATIONS

(71) Applicant: Yahoo! Inc., Sunnyvale, CA (US)

(72) Inventors: Sanchan Saxena, Edison, NJ (US);
Daryl Low, San Jose, CA (US);
Gaurav Vaish, San Jose, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 254 days.

(21) Appl. No.: 14/093,905

(22) Filed: Dec. 2, 2013

(65) Prior Publication Data
US 2015/0156061 A1    Jun. 4, 2015

(51) Int. Cl.
| | |
|---|---|
| *G06F 3/048* | (2013.01) |
| *H04L 12/24* | (2006.01) |
| *G06F 9/445* | (2006.01) |
| *H04L 29/08* | (2006.01) |
| *G06F 17/30* | (2006.01) |
| *H04W 4/00* | (2009.01) |

(52) U.S. Cl.
CPC ...... *H04L 41/0803* (2013.01); *G06F 9/44505* (2013.01); *G06F 17/30864* (2013.01); *H04L 67/34* (2013.01); *H04W 4/003* (2013.01)

(58) Field of Classification Search
CPC ............. G06F 3/0481–3/04842; G06F 17/30424–17/30991
See application file for complete search history.

(56) References Cited

U.S. PATENT DOCUMENTS

| | | | |
|---|---|---|---|
| 8,095,560 B2 | 1/2012 | Alnahlawi | |
| 2008/0242284 A1* | 10/2008 | Vechey | H04M 1/72544 455/415 |
| 2010/0058160 A1* | 3/2010 | Navarro | G06Q 10/0637 715/208 |
| 2011/0191330 A1 | 8/2011 | Barve et al. | |
| 2011/0314004 A1* | 12/2011 | Mehta | G06F 17/30017 707/723 |
| 2012/0042036 A1* | 2/2012 | Lau | G06F 8/61 709/217 |
| 2012/0124061 A1* | 5/2012 | Macbeth | G06F 9/445 707/749 |
| 2012/0284247 A1 | 11/2012 | Jiang et al. | |
| 2012/0323965 A1* | 12/2012 | Carpenter | G06F 17/3064 707/770 |

(Continued)

OTHER PUBLICATIONS

U.S. Appl. No. 14/093,908, filed Dec. 2, 2013, Saxena et al.

(Continued)

*Primary Examiner* — Claudia Dragoescu
(74) *Attorney, Agent, or Firm* — Weaver Austin Villeneuve & Sampson LLP (57) ABSTRACT

Techniques are described for providing deep linking capability from any mobile app to any other mobile app in a way that is scalable. App configuration information (including deep link information) is programmatically accumulated and provided to mobile devices in a way that enables launching or linking to mobile apps to meet expressed information needs of users. In addition, online marketplaces are described that employ such techniques to enable a wide variety of transaction types.

19 Claims, 5 Drawing Sheets

(56) References Cited

U.S. PATENT DOCUMENTS

| | | | | |
|---|---|---|---|---|
| 2013/0053005 A1* | 2/2013 | Ramer | ............... | H04W 4/025 455/414.1 |
| 2013/0080911 A1* | 3/2013 | Klemm | ............... | G06F 17/3089 715/745 |
| 2013/0151996 A1* | 6/2013 | Nario | ............... | H04W 4/003 715/760 |
| 2013/0252637 A1* | 9/2013 | Cha | ............... | H04W 4/021 455/456.3 |
| 2013/0332442 A1* | 12/2013 | Liu | ............... | G06F 17/30864 707/709 |
| 2014/0074931 A1* | 3/2014 | Bouvet | ............... | H04L 67/34 709/204 |
| 2015/0154644 A1 | 6/2015 | Saxena et al. | | |

OTHER PUBLICATIONS

PCT International Search Report and Written Opinion dated Feb. 20, 2015, issued in Application No. PCT/US2014/065207.
PCT International Preliminary Report on Patentability and Written Opinion dated Jun. 7, 2016, issued in Application No. PCT/US2014/065207.

* cited by examiner

DEEP LINKING TO MOBILE APPLICATIONS

BACKGROUND

People have been accessing content and otherwise filling their information needs on the Internet using browser applications for more than two decades. Users of such applications have become accustomed to a seamless browsing experience in which transitioning from one web page in the hierarchy of a web site to another web page in the hierarchy of another web site is a trivial and nearly instantaneous operation initiated by selection of a hyperlink. This seamless user experience is enabled by the fact that content publishers and other information providers employ a standard set of protocols and a single interface application, i.e., the browser. More recently, users have migrated to the use of mobile applications (i.e., mobile apps) on mobile devices (e.g., smart phones and tablets) to fill their information needs. However, because of the great diversity of mobile app providers, the relatively narrow content focus of mobile apps, and the lack of uniformity with which mobile apps are controlled and operate, the mobile user experience in filling information needs is anything but seamless.

For example, because mobile apps tend to have a narrow content focus, it is often necessary or desirable to switch from one mobile app to another to meet different information needs. This typically requires the user to close or exit the current mobile app, navigate to an interface to access a different mobile app, launch the new mobile app, and then provide input to the new mobile app to meet the information need. For example, a user might use a maps app to identify nearby restaurants. If she then wants to make a reservation at one of the restaurants shown in the map interface using a restaurant reservation app, she needs to exit the maps app, launch the reservation app, and then navigate to a reservation page for the desired restaurant by entering the name of the restaurant in the app home page; this even though the restaurant was already clearly identified in the interface of the maps app.

There are some mobile apps that allow users to launch and/or link to specific pages or interfaces in other mobile apps. For example, an email app might recognize a date in the body of an email and present that text as a link that can launch a calendar app directly to an interface in which an appointment for that date may be entered. However, the way in which such mobile apps are currently configured to accomplish this is a manual process in which human programmers of the first mobile app obtain information about the target mobile app (e.g., by reverse engineering or by partnering with the provider of the target mobile app) and code the functionality into their mobile app. As will be appreciated by those of skill in the art, such an approach is simply not scalable to the millions of mobile apps that are currently available and coming online every day. An additional challenge is represented by the frequency with which the code of mobiles apps is updated. That is, any mobile app that targets another mobile app in its code will typically require corresponding updates to ensure continued operability with the updated target app.

SUMMARY

According to a particular class of implementations, methods, systems and computer program products are provided for discovering mobile applications. Input is entered by a user in an interface of a mobile device. A first one of a plurality of information needs represented by the input is identified. A first subset of a plurality of mobile applications corresponding to the first information need is identified. Application configuration information is provided to the mobile device for the first subset of mobile applications. The application configuration information includes deep link information configured to enable the mobile device to launch or link to a corresponding one of the first subset of mobile applications in a manner that is responsive to the input entered in the interface of the mobile device.

According to a particular subclass of implementations, a data store is maintained that relates each of the plurality of mobile applications to one or more of the plurality of information needs and includes the application configuration information for each of the plurality of mobile applications. The application configuration information for each of the mobile applications specifies one or more parameters to be provided to the mobile application and the deep link information for the mobile application.

According to a particular subclass of implementations, the deep link information for each of the mobile applications includes a uniform resource indicator (URL) scheme for the corresponding mobile application, and a URL template for generation of one or more deep links to the corresponding mobile application.

According to another class of implementations, such application configuration information is received by a mobile device for a set of mobile applications. One or more representations of one or more of the mobile applications are exposed in an interface of the mobile application using the application configuration information.

According to a particular subclass of implementations, launching or downloading of one of the mobile applications occurs in response to selection of the corresponding representation.

According to a particular subclass of implementations, exposing the one or more representations of one or more of the mobile applications includes automatically launching one of the mobile applications.

According to a particular subclass of implementations, exposing the one or more representations of one or more of the mobile applications includes presenting a ranked list of entries in which each entry represents one of the mobile applications.

According to another class of implementations, a system for discovering mobile applications is provided. One or more data stores have data stored therein relating each of a plurality of mobile applications to one or more of a plurality of information needs. The one or more data stores include application configuration information for each of the plurality of mobile applications. The application configuration information for each mobile application specifies deep link information for the mobile application. The deep link information being configured to enable launching or linking to the corresponding mobile application. One or more computing devices are configured to implement a first application programming interface (API) configured to receive input from a first mobile application operating on a mobile device, and to identify a first one of the plurality of information needs represented by the input. The one or more computing devices are also configured to implement resolver logic configured to identify a second mobile application corresponding to the first information need. The one or more computing devices are also configured to implement launcher logic configured to provide the application the configuration information for the second mobile application to the mobile device. The one or more computing devices are also configured to implement a second API configured to receive at least some of the application configuration information for the second mobile application and determine whether the second mobile application can operate on the mobile device. The one or more computing devices are also configured to implement parser logic configured to parse the deep link information for the second mobile application and to decompose the deep link information to a format consumable by the second mobile application. The one or more computing devices are also configured to implement interstitial user interface logic configured to generate interfaces for the mobile device to facilitate launching of or linking to the second mobile application on the mobile device.

According to another class of implementations, methods, systems and computer program products are provided for programmatically generating application configuration information for a plurality of mobile applications. An instance of each of the mobile applications is programmatically downloaded from one of a plurality of mobile application provider platforms. Deep link information is programmatically generated for each of the mobile applications using the corresponding instance of the mobile application. The deep link information is configured to enable launching or linking to the corresponding mobile application in a manner that is responsive to user input. Metadata are programmatically generated for each of the mobile applications by scraping the metadata from the corresponding mobile application provider platform. One or more of a plurality of information needs are programmatically associated with each of the mobile applications based, at least in part, on the metadata for the mobile application. A first subset of the mobile applications corresponding to a first one of the information needs is identified. Application configuration information is provided for each of the first subset of the mobile applications. The application configuration information including the deep link information for each of the first subset of the mobile applications.

According to a particular subclass of implementations, the application configuration information for each of the mobile applications includes or specifies any one or more of an identifier of the mobile application, one or more parameters to be provided to the mobile application, a mobile operating system with which the mobile application is compatible, a human language supported by the mobile application, a category of the mobile application, payment information for the mobile application, a ranking of the mobile application, a rating of the mobile application, or a link for downloading the mobile application.

According to another class of implementations, methods, systems, and computer program products are provided for facilitating discovery of mobile applications. Input is entered by a user in a first interface of a mobile device. The first interface corresponds to a first mobile application operating on the mobile device. The first mobile application is associated with a first entity. One of a plurality of information needs represented by the input is identified. A second mobile application corresponding to the identified information need is identified. The second mobile application is associated with a second entity. Application configuration information for the second mobile application is provided to the mobile device. The application configuration information being configured to enable the mobile device to present a representation of the second mobile application in a second interface of the mobile device. A payment by the second entity to the first entity is facilitated in response to a mobile app discovery event relating to the second mobile application.

According to a particular subclass of implementations, the mobile app discovery event includes a launch of the second mobile application on the mobile device, linking to the second mobile application on the mobile device, downloading of the second mobile application to the mobile device, presentation of a link relating to the second mobile application on the mobile device, presentation of a sponsored listing for the second mobile application in connection with organic listings for other mobile applications responsive to the information need, selection of the second mobile application on the mobile device, or transmission of the application configuration information for the second mobile application to the mobile device.

According to a particular subclass of implementations, identification of the second mobile application results from a competitive bidding process among a plurality of entities including the second entity.

According to another class of implementations, an exchange is provided for facilitating discovery of mobile applications. The exchange tracks mobile app discovery events occurring in a network. Each mobile app discovery event involves identification of an information need represented by input received from a mobile device, identification of a mobile application corresponding to the information need, and transmission of application configuration information for the mobile application to the mobile device. The application configuration information is configured to enable the mobile device to present a representation of the corresponding mobile application in an interface of the mobile device. In response to each mobile application discovery event, the exchange facilitates a payment by a first entity associated with the mobile application corresponding to the mobile app discovery event to a second entity.

According to a subclass of implementations, in response to at least some of the mobile application discovery events, the exchange facilitates one or more additional payments by the first entity to one or more third parties. The one or more third parties include one or more of an operator of the exchange, a consortium of advertisers, a broker, an agent, an agency, or an advertising network.

According to a subclass of implementations, for at least some of the mobile discovery events, the input received from the mobile device was generated by a mobile application associated with the second entity operating on the mobile device.

A further understanding of the nature and advantages of various implementations may be realized by reference to the remaining portions of the specification and the drawings.

DETAILED DESCRIPTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

This disclosure describes techniques for providing deep linking capability from any mobile app to any other mobile app in a way that is scalable. Application configuration information (including deep link information) is programmatically accumulated and provided to mobile devices in a way that enables discovery of, launching, or linking to mobile apps to meet expressed information needs of users. In addition, online marketplaces are contemplated that employ such techniques to enable a wide variety of transaction types.

Figure 1:
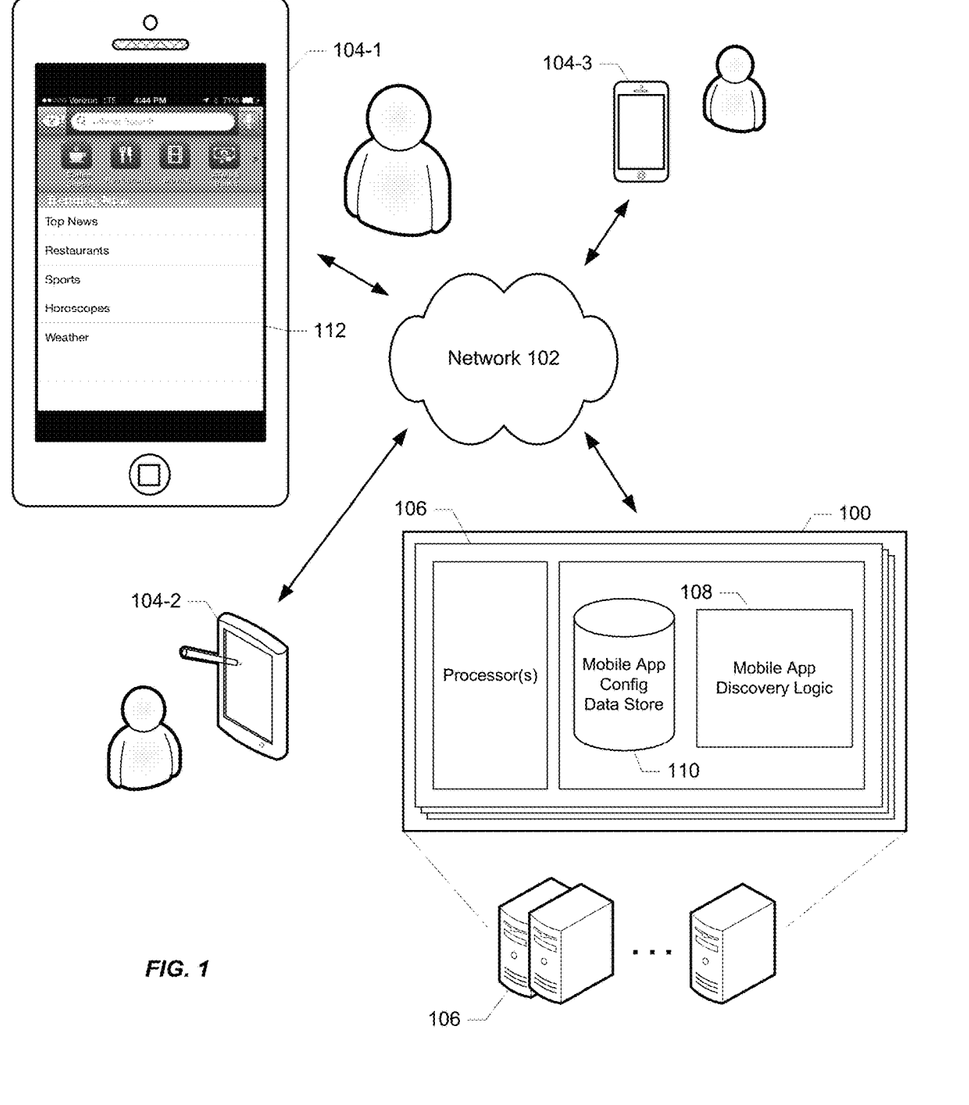
FIG. 1 is a simplified diagram of a computing environment in which embodiments of the invention may be implemented.

FIG. 1 shows an example of a computing environment in which mobile app discovery, deep linking, and related techniques as described herein may be facilitated by a mobile app discovery system 100 via network 102 for a wide variety of client devices (e.g., 104-1 through 104-3). Mobile app discovery system 100 may conform to any of a wide variety of architectures such as, for example, a distributed platform deployed at one or more co-locations, each implemented with one or more servers 106. Network 102 may include any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 104 may be any suitable device capable of connecting to network 104 and interacting with mobile app discovery system 100. Such devices are generally contemplated to be mobile devices (e.g., cell phones, smart phones, smart watches, and tablets) but, for some implementations, may also include personal computers (e.g., laptops and desktops), set top boxes (e.g., for cable and satellite systems), smart televisions, gaming consoles, etc. In addition, at least some of the examples described herein contemplate cloud-based implementations built in accordance with computing models that enable ubiquitous, convenient, on-demand network access to a shared pool of computing resources (e.g., networks, servers, storage, applications, and services).

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

Mobile app discovery system 100 may be an independent system or may be integrated within a larger system such as, for example, a mobile app store with which users may download mobile apps, or a mobile app discovery exchange which facilitates monetization of mobile app discovery. As will be understood, such systems may include various types of logic and provide interfaces with which users may access various system functionalities, e.g., search for and download mobile apps or specify campaigns (not shown for clarity). According to a particular class of implementations, system 100 includes mobile app discovery logic 108 configured to identify application configuration information (e.g., stored in data store 110) for mobile apps that are responsive to an information need expressed by a user. It should be noted that, while mobile app discovery logic 108 and data store 110 are contemplated to be integrated with a mobile app discovery system, implementations are also contemplated in which either or both operate remotely from the mobile app discovery system, and/or either or both are under the control of an independent entity. Implementations are also contemplated in which at least some of the functionality of mobile app discovery logic 108 is implemented and/or stored on client devices (e.g., device 104-1).

Figure 2:
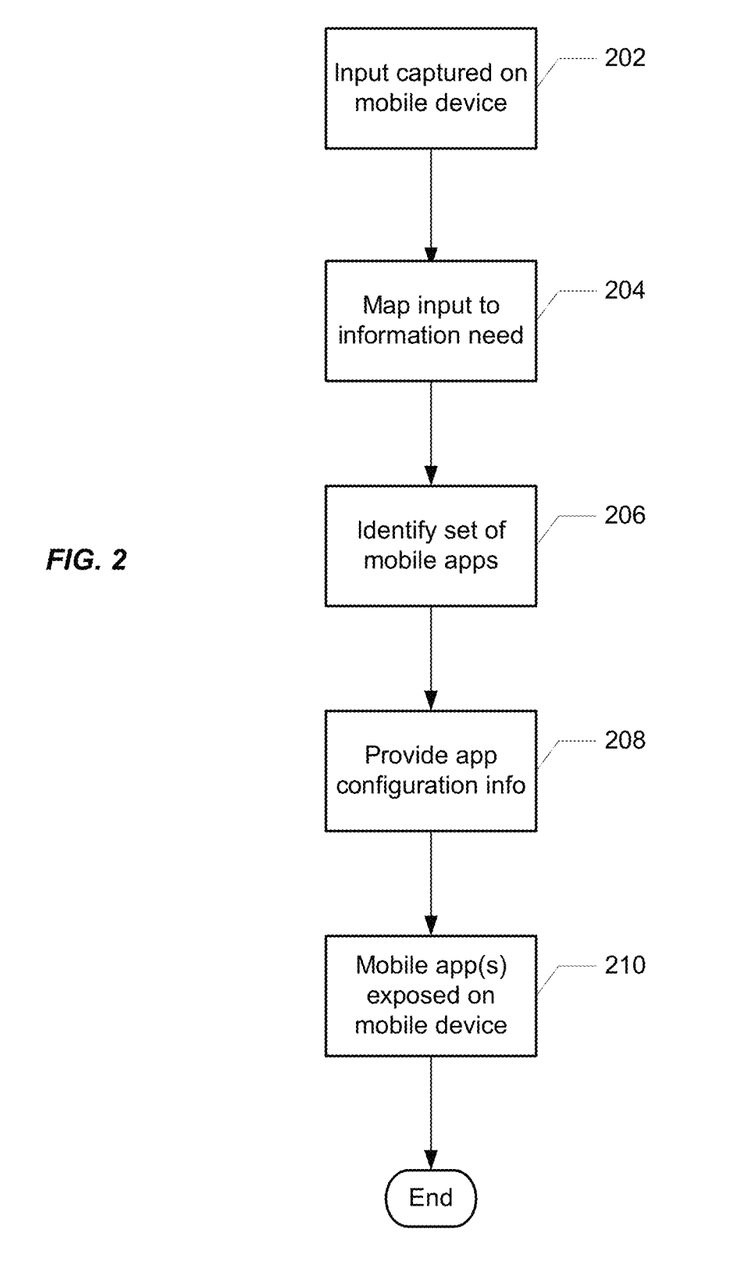
FIG. 2 is a flow diagram illustrating mobile app discovery according to a specific implementation.

A specific class of implementations will now be described with reference to the computing environment of FIG. 1 and the flow diagram of FIG. 2. In the depicted implementation, a user takes an action on his mobile device (e.g., device 104-1) that results in the capture of some kind of input representing an "intent" or "information need" that is transmitted to mobile app discovery system 100 (202). As used herein, "intent" and "information need" are synonymous terms that reflect a desire of the user, expressed directly or indirectly, to access information using his mobile device.

As will be appreciated, the terms "intent" and "information need" encompass a broad range of actions, inputs, and information types. For example, the user might enter a keyword in the search field of a search app interface 112 as shown in FIG. 1. Alternatively, the user might utter a verbal request to an interactive digital assistant program. As yet another alternative, the user might touch or tap an icon or link presented in on the screen of his mobile device. As still a further alternative, the user might take a photograph (e.g., of store front at a particular geographic location) that is provided to image recognition software. Virtually any action taken by the user on his mobile device that can be related to or interpreted as an information need may initiate mobile app discovery as described herein. As will also be appreciated, the number of mobile apps that embody functionality that may be suitable or appropriate for filling the user's information need may also be quite large.

The captured input is mapped (e.g., by mobile app discovery logic 108) to one or more particular intents or information needs (204). That is, mobile app discovery system 100 employs a predetermined (but potentially evolving) set of intents or information needs (e.g., stored in data store 110) that typically define or represent functionality that might be appropriate to meet the information need underlying the captured input. For example, if the user entered the keyword "Rihanna" in a search app, the intent or information need could be "listen to music," "read entertainment news," or "download music tracks." Alternatively, if the user tapped a link to a restaurant in a maps app, the intent or information need could be "read restaurant review" or "make restaurant reservation." As will be appreciated, any particular input may be mapped to multiple intents or information needs.

According to a particular implementation, the mapping of the input to intent(s) or information need(s) may take a variety of information into account. For example, if the input includes or can be represented by one or more keywords, those keywords might be mapped to keywords associated with the predetermined intents or information needs, directly or indirectly, e.g., Rihanna is a musician therefore the intent "listen to music" is an appropriate mapping. Information about the particular user might also be leveraged to determine, refine, or rank the set of intents or information needs to which particular input could potentially be mapped. For example, user demographics, user preferences, user online behavior, user context (physical or virtual), etc., might be used to determine that, because the user is an avid birdwatcher living in New England during the spring time, the keyword "cardinals" is probably more appropriately mapped to the intent "purchase book" (e.g., about bird watching) than "read sports news" (e.g., about the Arizona Cardinals of the NFL). Mapping to a particular intent or disambiguation between or among multiple intents might be accomplished with reference to contextual information about the user. That is, the intent of the user may be inferred or otherwise derived from his context. For example, if the user entered "windows," he might be searching for information about the Windows operating system, or he might be expressing an interest in upgrading the windows in his home. An inference as to which of these is more likely might be informed by the user's location (e.g., Home Depot vs. an Apple store) or recent behavior (e.g., recent searches for "Macintosh" or "Bill Gates" vs. "home improvement" or "carpenters." Those of skill in the art will understand that the range of information that may be taken into account in identifying one or more intents or information needs corresponding to particular input is quite broad.

A set of mobile apps associated with the identified intent(s) or information need(s) is identified (206). That is, data store 110 includes a database or other suitable data structure (details of a particular implementation of which are described below) that associates each of the predetermined intents or information needs with a set of mobile apps that are suitable for meeting that intent or information need in some way. For example, if the information need is "read restaurant reviews," the corresponding set of mobile apps might include Yelp, Urbanspoon, OpenTable, etc. In another example, if the information need is "read sports news," the corresponding set of mobile apps might include Yahoo! Sports, ESPN Scorecenter, Fox Sports mobile, etc. For the "windows" example discussed above, Search App or the GoodReads app might correspond to finding out more about the Windows operating system, while the DIY, HomeDepot, or Sears apps might correspond to learning more about replacing windows in one's home. It should be noted that a particular mobile app might map to multiple intents or information needs, e.g., Open Table for both restaurant reviews and reservations.

The correspondence between mobile apps and particular intents or information needs may also be informed by the nature of the primary functionality of the mobile apps. That is, a mobile app may be considered "explanatory," "informational," "social," "communicative," "configurative," "transactional," etc. These categories or labels might be useful in identifying or ranking a mobile app as being responsive to a particular intent or information need where the intent or information need may be similarly characterized. For example, if the intent identified is "purchase music," mobile apps which facilitate such transactions might be ranked higher or selected instead of mobile apps which just play music.

It should also be noted that the granularity with which information needs are defined may vary depending on the particular implementation. The appropriate number of intent or information need "buckets" to which input can be mapped and with which mobile apps may be associated will reflect a balance between being able to determine the user's intent with granularity and making the system robust in the face of new mobile apps and changes in app functionality and/or user population. In addition, the number of intents or information needs and the mobile apps to which they correspond may evolve over time. For example, the set of mobile apps that are considered responsive to a particular information need may evolve over time as users migrate to different or new mobile apps to fill that information need. In another example, the information need to which a mobile app corresponds may change as the functionality of the mobile app changes. The set of information needs may change as users consume content differently over time. More generally, by observing the behavior of a population of users, the mobile apps they use, and the types of information needs those mobile apps are used to fill, a suitable set of intents or information needs, and the mobile apps to which they correspond can be maintained.

The superset of mobile apps responsive to a particular intent(s) or information need(s) might be filtered and/or ordered based on a wide variety of information. Such information might include any portion of the user information discussed above, as well as other information, e.g., the popularity of particular mobile apps or the relevance of particular mobile apps to the input or information need. That is, only a subset of the entire set of mobile applications associated with the intent(s) or information need(s) might be identified as being suitable in a particular situation. For example, because the user's primary language is English, versions of otherwise responsive mobile apps in other languages might be excluded. In another example, if a particular responsive app is highly popular among males, ages 18-25, that app might be ranked highly in the returned set of responsive apps if the user matches that demographic. In yet another example, the inclusion and/or ranking of a particular mobile app might be responsive to previous responses of the user to the discovery of mobile applications as described herein, e.g., if the user previously selected or downloaded a particular mobile app associated with a particular information need this might affect the inclusion or ranking of that mobile app going forward for that information need and/or that particular user. And as will be discussed, the inclusion and/or ranking of responsive mobile apps for a given intent or information need may be affected by economic relationships among app providers (e.g., for both "calling apps" from which the original user input is received, and "target apps" associated with the information need to which the input is mapped).

Once a responsive set of mobile apps is identified, application configuration information for each of the responsive mobile apps is provided to the mobile device (208). The application configuration information includes "deep link" information for the corresponding mobile app configured to enable the mobile device to launch or link to that mobile app (e.g., if already downloaded to the mobile device) in a manner that is responsive to the user's original input or the information need to which the input was mapped. For example, if the user's input was "nearby Greek restaurant,"

the identified information need might be "read restaurant reviews" and the responsive set of mobile apps might include Yelp. The application configuration information corresponding to the Yelp app would include sufficient information for the calling app or the user's mobile device to generate a "deep link" for the Yelp app which would result in launching Yelp and/or linking directly to a Yelp page listing nearby Greek restaurants.

More generally, and as used herein, the term "deep link" refers to a link that enables launching of and/or linking to app pages within the hierarchy of a mobile app that are below the app home page in the hierarchy. And in some cases, the deep link includes information derived from the user's input and/or the determined intent or information need that connects with such a page in the mobile app hierarchy in a way that is responsive to the user's input (e.g., the review page for a particular restaurant). And as will be discussed below, a wide variety of other information may be included in the application configuration information for each mobile app to facilitate mobile app discovery.

The mobile device uses the application configuration information to surface or otherwise expose one or more representations of one or more of the corresponding mobile apps to the user (210). This exposure may take on a wide variety of forms depending on the particular implementation and may depend on whether the responsive mobile apps represented in the application configuration information are already on the mobile device. For example, the calling app or the mobile device might use the deep link information for a particular one of the mobile apps that is already on the user's device to launch or deep link to that mobile app. Such an approach might be appropriate where, for example, there is only one responsive app, where the particular mobile app is considered the best option for the information need, or where the provider of the calling app has a preference for that target app (e.g., based on a revenue sharing with the target app provider or other deals with partners). If the best mobile app is determined not to be on the device, the user could be redirected to download the mobile app from an appropriate app store.

In another example, the calling app or the mobile device might provide a ranked list of the responsive mobile apps; somewhat analogous to keyword search results. Each listing might correspond to one of the mobile apps and include one or more links that enable the launching and/or deep linking to that mobile app or, where the mobile app is not currently on the device, the downloading of the mobile app. Multiple listings for different deep links might be presented for the same mobile app, e.g., two Spotify listings, one for an artist and one for that artist's most popular track. Such a ranked list of mobile apps might include both "organic" listings and "sponsored" listings. Organic listings correspond to mobile apps that are responsive to the user's input and/or the identified information need. Organic listings may also be responsive to information about the user (user demographics, user preferences, user online behavior, user context (physical or virtual), etc.), mobile app popularity, etc.

Sponsored listings may also be responsive to at least some of the same information as organic listings but are included (possibly in an segregated and/or designated part of the interface), at least in part, because of an economic relationship involving the provider of the mobile app corresponding to the sponsored listing, e.g., the target app. As will be discussed, this relationship might be with the provider of the calling app, or with some intermediary or third party, and might involve, for example, a bid or payment by the target app provider for the identified information need.

As will be appreciated, there are a wide range of ways in which the application configuration information for the mobile apps responsive to the information need(s) may be employed to help serve the information need expressed by the user's input. This may be entirely within the control of the calling app provider, or may be controlled to some degree by agreements with the target app provider, the mobile app discovery system, business partners, or some combination of these. And the manner in which responsive mobile apps are exposed on the mobile device may be affected by a wide variety of information including user information and mobile app information as described above. The way in which the application configuration information is encoded and stored may vary considerably as well. According to a particular class of implementations, the application configuration information is encoded using JavaScript Object Notation (JSON).

According to a particular class of implementations, the deep link information included in the application configuration information includes a uniform resource indicator (URL) scheme for the corresponding mobile app, and a URL template for generation of one or more deep links to the corresponding mobile app. The URL scheme defines the basic URL root for the mobile app (e.g., "ysports" for the Yahoo! Sports app or "yfinance" for the Yahoo! Finance app). The URL template provides a template that incorporates the URL scheme and with which deep links to the mobile app may be created. The calling app or the mobile device can use this information to launch and/or deep link to the mobile app. It should be noted that a mobile app may support multiple URL schemes that may be reflected in the deep link information.

According to more specific implementations, a variety of other information may be included in the application configuration information for each of the mobile apps. Some examples follow. It should be noted, however, that these are merely examples and do not represent an exhaustive list of possibilities. Exclusion or inclusion of the described information in the application configuration information may vary for a given implementation.

The application configuration information may include a type identifier that specifies the type of content that may be presented or acted upon by the corresponding mobile app. Examples of content type include audio, video, text, image, etc. As will be appreciated, this information may be used to facilitate association of mobile apps (e.g., based on their primary functionality) with particular intents or information needs. It may also be used to rank mobile apps that are responsive to a particular intent or information need, e.g., in cases where the application configuration information also includes some indication of the suitability or relative rank of a mobile app for a given content type.

The application configuration information may identify one or more parameters that may be required and/or used by the mobile app for launching or deep linking. Such parameters might include, for example, an identifier of content that is specifically responsive to the information need to which the mobile app is generally responsive. An example of a mandatory parameter might be a location for a mobile app that provides weather reports, e.g., one weather app might require a zip code while another might require the current location of the mobile device in latitude and longitude. Another example of a mandatory parameter might be a stock symbol for financial app to provide a stock quote. On the other hand, an optional parameter might be the specific stock exchange (e.g., the NASDAQ for the Yahoo! Finance app vs.

the NYSE for the Moneycontrol app. See specific implementations of these examples below.

The application configuration information may identify the mobile device operating system(s) and the minimum version(s) of each OS (e.g., Android or iOS) required to install the mobile app. Such information may be used to filter the responsive mobile apps for a given mobile device. The minimum version of the mobile app for handling a particular content type may also be specified. This information might be useful where, for example, the user's device has an older version of the mobile app on the device. The application configuration information may also include one or more links to one or more app stores from which the mobile app may be downloaded. Further information may also be included such as supported language, market or recommended age group, etc.

An example of the application configuration information for a number of mobile apps that might be returned in response to a particular information need is provided below:

```
{
  "apps": [
    {
      "type": "/article/video/",
      "mandatory": [
        "articleId"
      ],
      "scheme": "yhomerun",
      "template": "article/video/{articleId}",
      "min_app_version": "1.1",
      "min_os_version": 5.1,
      "app_id": "1234567890"
      "rank": 1,
    },
    {
      "type": "/article/finance/",
      "mandatory": [
        "articleId"
      ],
      "scheme": "yfinance",
      "template": "article/finance/{articleId}",
      "min_app_version": "1.1",
      "min_os_version": 5.1,
      "app_id": "1234567891"
      "rank": 1
    },
    {
      "type": "/article/ ",
      "mandatory": [
        "articleId"
      ],
      "scheme": "yhomerun",
      "template": "article/{articleId}",
      "min_app_version": "1.1",
      "min_os_version": 5.1,
      "app_id": "1234567890"
      "rank": 1
    },
    {
      "type": "/article/",
      "mandatory": [
        "articleId"
      ],
      "scheme": "yfinance",
      "template": "article/{articleId}",
      "min_app_version": "1.1",
      "min_os_version": 5.1,
      "app_id": "1234567891"
      "rank": 2
    },
    {
      "type": "/article/sports/match/report/",
      "mandatory": [
        "articleId"
      ],
      "scheme": "ysports",
```

-continued

```
      "template": "article/{articleId}",
      "min_app_version": "1.1",
      "min_os_version": 5.1,
      "app_id": "1234567892"
      "rank": 1
    },
    {
      "type": "/article/",
      "mandatory": [
        "articleId"
      ],
      "scheme": "ysports",
      "template": "article/{articleId}",
      "min_app_version": "1.1",
      "min_os_version": 5.1,
      "app_id": "1234567892"
      "rank": 3
    }, {
      "type": "/stock/quote",
      "mandatory": [
        "symbol"
      ],
      "optional": [
        "stock_exchange"
      ],
      "scheme": "yfinance",
      "template": "quote/ {symbol}",
      "min_app_version": "1.1",
      "min_os_version": 5.1,
      "app_id": "1234567890"
      "rank": 1,
    }, {
      "type": "/weather/",
      "mandatory": [
        "zip"
      ],
      "scheme": "yweather",
      "template": "weather?zip={zip}",
      "min_app_version": "1.1",
      "min_os_version": 5.1,
      "app_id": "1234567890"
      "rank": 1,
    }, {
      "type": "/weather/",
      "mandatory": [
        "lat", "long"
      ],
      "scheme": "yweather",
      "template": "weather?lat={zip}&long={long}",
      "min_app_version": "1.1",
      "min_os_version": 5.1,
      "app_id": "1234567890"
      "rank": 1,
    }
  }
}
```

In this example (which represents various Yahoo! mobile apps designed for Apple's iOS), the application configuration information includes the content type, a mandatory parameter, the URL scheme, a URL template, the minimum app version, the minimum operating system version, the mobile app identifier (using Apple's app store schema), and a ranking for the mobile app. It will be understood that this example is merely by way of illustration and that the application configuration information for mobile apps may include more or fewer elements for a given implementation.

As mentioned above, the application configuration information provided for the mobile apps that are responsive to an intent or information need may be ordered or ranked by the mobile app discovery system. According to particular implementations, any such ordering or ranking may or may not be taken into account on the mobile device with regard to the manner in which the information is used to expose one or more of the mobile apps. That is, as discussed above, the provider of the calling app may have control over how this information is used and the manner in which mobile apps are exposed. Thus, even if the application configuration information is provided with a particular order or ranking, the calling app provider can choose to expose one or more of the mobile apps based on any available criteria. For example, the calling app might be configured to launch only one of the mobile apps or to reorder a listing of the mobile apps in accordance with a revenue sharing arrangement with a provider of one of the mobile apps, or based on the fact that the provider of one of the mobile apps is willing to pay more for exposure of its mobile app than other providers (e.g., as specified in the application configuration information). In another example, the calling app might favor target apps from the same provider over those of other providers. In yet other examples, the calling app might favor target apps based on information about the user (user demographics, user preferences, user online behavior, user context (physical or virtual), etc.), mobile app popularity, etc. More generally, the calling app provider may choose to configure the calling app to order, rank, or select the mobile apps for exposure based on any of a wide variety of criteria that suit the goals of the calling app provider.

According to a particular implementation, the input received from the user's device is accompanied by an information set including various parameters relating to the user's device and/or the calling app from which the input is received. The device parameters may include, for example, the device type (e.g., smart phone, tablet, music player, etc.; possibly identifying the manufacturer), the device operating system and version (e.g., iOS 5.1, Android 14, etc.), calling app identifier and version (e.g., in Android or Apple format), app store identifier (e.g., Google, Apple, Amazon, Windows, etc.), geographic region identifier (e.g., 2-character country code), and language identifier (e.g., 2-character language code). Such information might also identify what mobile apps are already installed on the mobile device and/or information about the user (e.g., user demographics, user preferences, user online behavior, user context (physical or virtual), etc.) as a way to inform the various processing steps and decisions made at the back end as described herein. It should be noted that this list includes examples of information that may be provided by the mobile device or calling app, but implementations are contemplated in which the mobile device provides only a subset of this information, includes additional information, or provides none of the information listed.

Information about the user, the mobile apps installed on the user' mobile device, and/or actions taken by the user in connection with the exposure of mobile apps on his mobile device may be captured and/or tracked for subsequent use by the mobile app discovery system. For example, a user's selection or downloading of a mobile app might be used to determine what mobile apps are responsive to a subsequently expressed information need. In this way, the mobile app discovery system can, over time, refine the way in which it responds to the information needs of a particular user.

Figure 3:
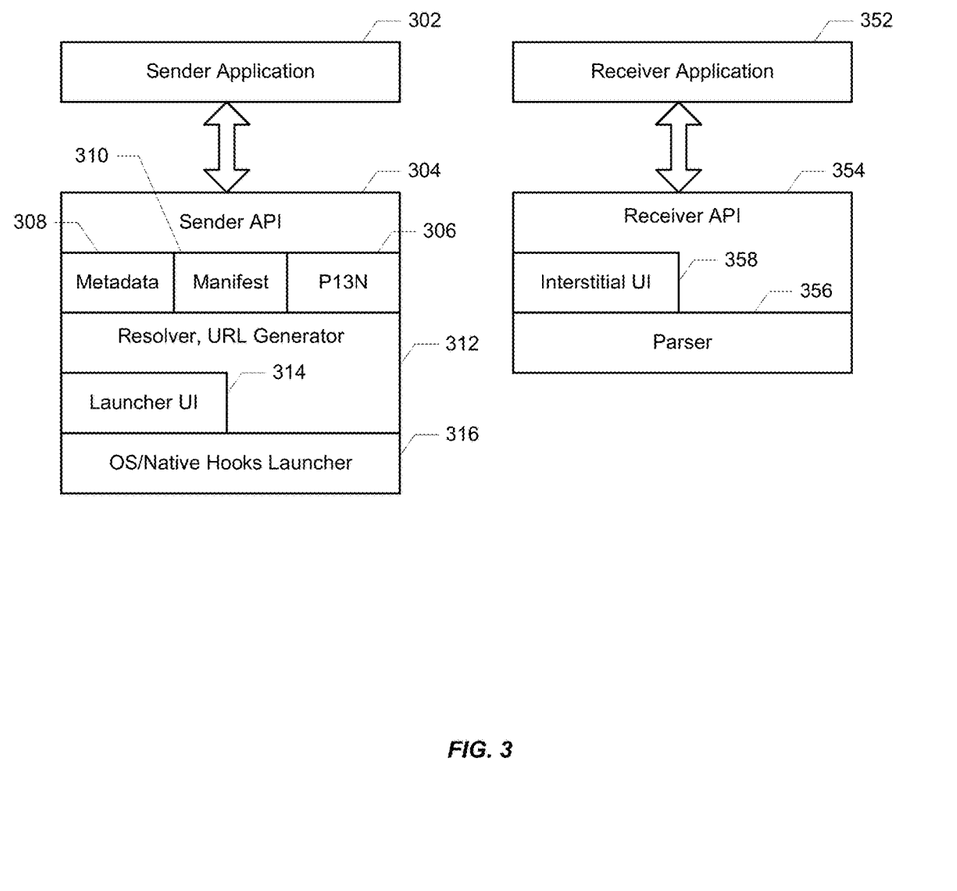
FIG. 3 is a block diagram illustrating mobile app discovery according to a specific implementation.

FIG. 3 is a block diagram of a processing stack that illustrates the way in which a mobile app discovery system interacts with calling apps and target apps according to a particular implementation. A sender application 302—the calling application with which the user initially interacts—receives the input that represents the user intent. This application sits at the highest layer in the stack (closest to user interaction) and interacts with the sender API 304 which processes the input using other indirect but related inputs such as, for example, personalization related information 306, local metadata 308 and deep link manifest 310. Some or all of these inputs may reside on the back-end server to allow real-time computation.

A resolver 312 consumes the complete set of inputs to generate the final deep link URL used to interact with the target application. Next in the stack, launcher UI 314 uses the output of resolver 312 and interacts with operating system 316 to either launch the target application or help the user to download the target application from the applicable source (e.g., Google Play, Amazon Store, iTunes App Store, Windows Marketplace etc).

In one of the implementations, JSON data format may be used to represent the information. Examples of personalization related information 306 include, but are not limited to, prior history of user interaction with the application, previous deep links followed by the user, longevity of the user interaction in the context, applications installed on the device, version information of the applications installed, etc. Local metadata 308 may include information about the operating system, location, time, user preferences, etc. Deep link manifest 310 represents the mapping of user intent to applications, version information related to availability of specific features in an application, etc. Launcher UI 314 may be built, for example, using Java for Android, Objective C for iOS, or C# for Windows Phone mobile operating systems.

A receiver application 352 is the target application that user launches or links to when interacting with a deep link. The user may choose to interact with the deep link explicitly by, for example, tapping a button, or implicitly by, for example, choosing to navigate directly to the best results when following up on the expressed intent. Receiver API 354 uses parser 356 to parse the incoming deep link to decompose into a format that is easily consumable by receiver application 352. Receiver API also refers to application specific information, e.g., minimum version of the application required (if different), minimum operating system version required (if different), etc. If some of these requirements are not fulfilled, interstitial UI 358 may prompt the user for updates or with other notifications in case the intent cannot be fulfilled completely.

Once all requirements are satisfied and parsing done successfully, the parsed details are passed to receiver application 352 for further processing thereby helping the user to accomplish his intent. Once complete, the user may continue in receiver application 352 or may return to sender application 302.

According to a particular class of implementations, at least a portion of the application configuration information maintained by a mobile app discovery system (e.g., maintained in data store 110 by system 100 of FIG. 1) is acquired and maintained programmatically. That is, as discussed above, manual acquisition and maintenance of the types of application configuration information described herein are not scalable to encompass the ever increasing number of mobile apps, or to accommodate the rate at which mobile apps require updates. Therefore, according to this class of implementations, programmatic techniques are employed to populate and maintain such information.

Figure 4:
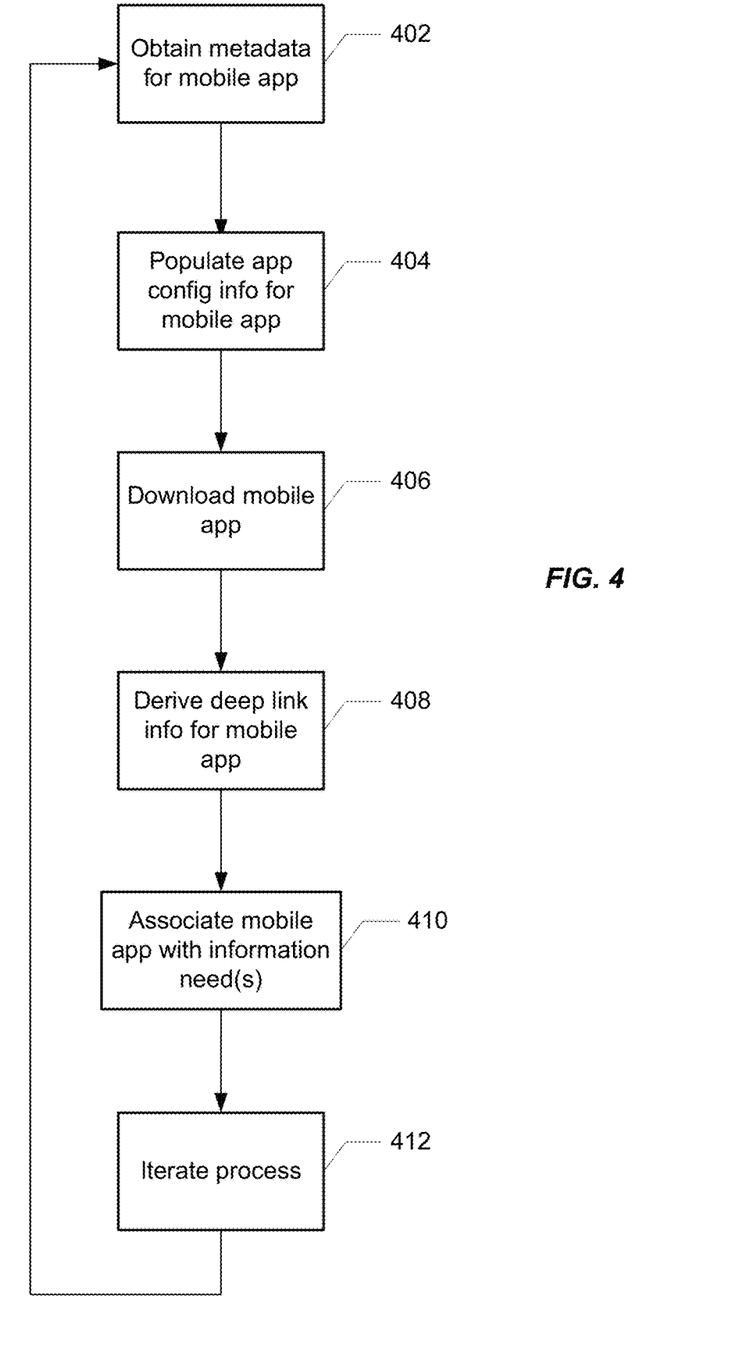
FIG. 4 is a flow diagram illustrating programmatic acquisition of application configuration information for mobile apps according to a specific implementation.

FIG. 4 includes a flow diagram that illustrates an example of a process for programmatically acquiring and maintaining application configuration information for a large number of mobile apps. For illustrative purposes, the process is presented as a repeating loop in which the configuration information for a particular mobile app is acquired or updated. As will be appreciated, the depicted operations for different mobile apps may be occurring serially or in parallel with varying degrees of overlap or simultaneity without departing from the scope of the present invention. It will also be appreciated that, while the depicted operations are described primarily as occurring programmatically, i.e., as part of an automated, software-controlled process, at least some operations generating at least some of the application configuration information for at least some of the mobile apps may be augmented with manual efforts by human operators. For example, it may be desirable to manually verify that the programmatically derived application configuration information is valid. For example, manual testing may be undertaken to ensure that the deep links for particular mobile apps are working. In another example, the mapping of a mobile app across tech stacks might be done manually to confirm that the mobile app is the same mobile app for Android, iOS, and Windows phones, e.g., an app provider might use different names or nomenclatures across tech stacks.

Referring now to FIG. 4, information (e.g., mobile app metadata and descriptive information) for a particular mobile app is derived from a variety of sources, for example, by scraping web pages using a specialized web crawler (402). The primary sources of such information are contemplated to be the download, description, and/or specification pages associated with the mobile app at an app store such as, for example, app stores provided by Apple, Google, Amazon, Microsoft, Firefox, etc. The information might include any information the app store provides in conjunction with a mobile app that might have some utility in mapping the mobile app to an intent, ranking the mobile app, mapping the mobile app to a particular user or market, etc. Other sources of information might include, for example, ratings, reviews, and descriptions from anywhere on the Internet, e.g., blogs, review sites, consumer sites, etc.

The information acquired from these various sources is used to populate various information types included in the application configuration information for the mobile app (404). As will be understood, some of the information scraped from the various sources may not be suitable or appropriate for inclusion in the application configuration information for the mobile app. Such information may be discarded, or may be maintained and used for other purposes as discussed below.

An instance of the mobile app is downloaded from app store (406). As will be understood, this may be done for each version of the mobile app (for initial entry or updating), or may not be required for minor updates (e.g., as may be determined with reference to the information scraped from the app store (e.g., in 402). Deep link information is programmatically derived from the downloaded mobile app (408). For example, the URL scheme and URL template may be derived by instantiating the mobile app and scraping information from various pages in the mobile app hierarchy, e.g., those that may be accessed without signing in. According to a particular implementation, at least some of the deep link information may be acquired or derived from uncompressing the mobile app and parsing its manifest files (e.g., plist information on iOS). Deep link information may be derived from official documentation of the mobile app provider (e.g., such as that available from Twitter or Yelp), or from software development kit (SDK) code (e.g., such as that available from Facebook or Tumblr). Mobile app providers might also be encouraged to publish or provide deep link information in a template format provided by the mobile app discovery system that ports the information directly to the system's data store and/or into the application configuration information for the corresponding mobile apps.

The mobile app and/or its application configuration information are associated with one or more intents or information needs (410). This may be done with reference to a range of information associated with the mobile app. This might include information obtained in connection with the mobile app that is not ultimately included in the application configuration information for the mobile app. For example, keywords or categories associated with the mobile app by the mobile app provider or by third parties (e.g., reviewers or the app store) may be used to inform the determination. And as discussed above, the nature of the primary functionality of a mobile app (e.g., "informational" vs. "transactional") might be used. Additional information includes app ratings, descriptions, and even the age or version of the mobile app, e.g., when the first version was released, how many versions have been released, when was the most recent version released, etc. Again, mobile app providers might be encouraged to publish keywords or other useful information in a template format provided by the mobile app discovery system that ports the information directly to the system's data store and/or into the application configuration information for the corresponding mobile apps.

The process shown in FIG. 4 may be iterated (412) for a mobile app already represented in the system. This is useful for ensuring that the current functionality and use of the mobile app effectively fills the information need with which it is associated. It also ensures that updates to the mobile app are reflected in the application configuration information maintained by the system when necessary to ensure continued operation. Subsequent iterations for a given mobile app might be internally triggered on a periodic basis. Alternatively, iterations might be responsive to external triggers such as, for example, notifications that updates of the mobile app are available. In the latter example, the system may determine whether to initiate an iteration with reference to information describing the update (e.g., as obtained from an app store or the app provider). For example, where the update information is relatively minor and will not result in a change to the current application configuration information, a decision to forego the iteration could be made.

As will be apparent from the foregoing description, a scalable approach to mobile app discovery for the purpose of meeting specific information needs is provided. And as alluded to above, these techniques may be leveraged to support a variety of transactions. A mobile app discovery exchange in which examples of such transactions are supported is described below with reference to FIG. 5.

Figure 5:
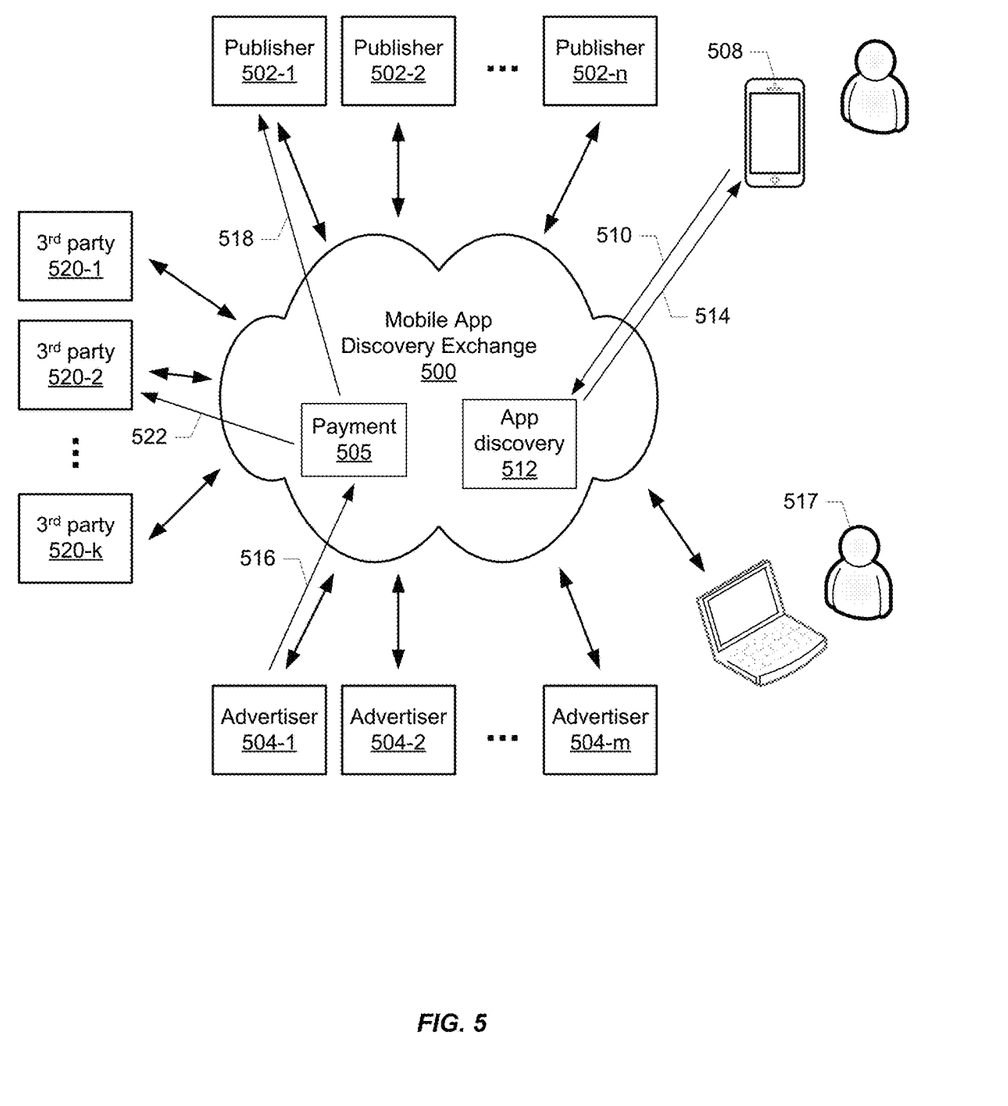
FIG. 5 is a simplified diagram of a particular implementation of a mobile app discovery exchange.

Mobile app discovery exchange 500 provides an efficient mechanism by which the respective inventories of publishers 502 (e.g., providers of calling apps) and advertisers 504 (e.g., providers of target apps) may be connected, and provides a payment system 505 that facilitates payments in response to payment events, e.g., listing placements, launches, downloads, user selections (e.g., taps, swipes, or touch events), etc. As will be understood, there may be considerable overlap among publishers and advertisers. That is, publishers may also be advertisers (e.g., when their mobile app is a target app) and advertisers may also be publishers (e.g., when their mobile app is a calling app). In addition, the publisher and the advertiser for a given pair of calling and target apps may be one and the same. A range of possible variations on this theme should be apparent.

As with conventional advertising exchanges, publishers participating in mobile app discovery exchange 500 are looking to provide a context in which advertisers can pay them for exposure of their products or services. However, unlike conventional advertising exchanges, what is exposed to users in connection with the operation of exchange 500 are not advertisements in the conventional sense, but mobile apps that fill the specific information needs expressed by the users. Further, as discussed above, users are not only made aware of the existence of the mobile apps. Rather, the information needs represented by the user input can be met directly through the deep link information provided for mobile apps. Some examples of transactions enabled by exchange 500 may be instructive.

In one example, advertisers may bid on various intents or information needs. The bids represent payments the advertisers make when their mobile app is exposed to a user in response to the information need represented by the user's input. For example, as described above, when a user associated with mobile device 508 takes an action resulting in input 510 being captured for mobile app discovery by mobile app discovery system 512, that input is mapped to one or more intents or information needs. The application configuration information 514 for one or more mobile apps that meet the information need(s) are identified and transmitted to mobile device 508. As discussed above, this may include application configuration information for one or more mobile apps of advertisers that bid on the information need(s) or are otherwise willing to pay for exposure of their mobile apps. Also as discussed above, information about the user, the mobile apps installed on the user' mobile device, and/or actions taken by the user in connection with the exposure of mobile apps on his mobile device may be captured and/or tracked to inform these operations.

In conjunction with this process, a call is made to exchange 500 (e.g., by mobile app discovery system 512) that might result, for example, in a competitive bidding process among advertisers for exposure of their mobile apps, or execution of predetermined arrangements between a particular publisher and one or more of the advertisers. Occurrence of a mobile app discovery event, e.g., exposure of one or more mobile apps on mobile device 508, results in payments by the corresponding advertisers (e.g., payment 516 by advertiser 504-1).

Payments may be determined and triggered according to a wide range of criteria and events including, for example, a bid amount specified by the advertiser, the manner in which the mobile apps are exposed, a revenue sharing arrangement between the advertiser and the publisher (formalized by agreement or not), etc. For example, a payment might be determined by the rank of a sponsored listing for the mobile app, or triggered by the fact that the mobile app was automatically launched on the mobile device. In another example, the advertiser could agree to pay the publisher some percentage of the fee paid by the user for purchasing the advertiser's mobile app as a result of the exposure by the publisher. Alternatively, a publisher can set the fee(s) for one or more modes of exposure in the context of his mobile app. These examples illustrate the wide range of possibilities for ways in which payments by advertisers may be determined and triggered.

According to some implementations, information relating to such payments or revenue sharing arrangements may be reflected in the application configuration information provided in response to the input. For example, the application configuration information returned to a calling app might indicate a specific payment amount or revenue sharing arrangement for exposure of the mobile app. Such information might be useful, for example, as an inducement to the publisher receiving the application configuration information to expose that advertiser's mobile app in a favorable manner. The advertiser may even be able to specify how its mobile app is to be exposed for a payment to be made, e.g., highlighting, color, font style, etc. Alternatively, implementations are contemplated in which the advertiser's mobile app is automatically exposed and payment effected without intervention by the calling app.

As with other types of advertising platforms and exchanges, mobile app discovery exchange 500 may provide processes and interfaces (not shown for clarity) that are configured to enable representatives of advertisers (e.g., 517) to specify campaigns which define, for example, a target set of keywords or information needs to which the advertiser would like its mobile apps to be responsive, mobile app discovery events for which the advertiser is willing to pay, payment terms (e.g., bid amounts or revenue sharing), and/or a target audience to whom the advertiser is interested in exposing its mobile apps. As discussed elsewhere herein, a target audience may be specified with reference to any of a variety of user information such as, for example, user demographics, user preferences, user online behavior, user context (physical or virtual), etc.

As discussed above, implementations are contemplated in which the input received from the user's device is accompanied by an information set including various parameters relating to the user's device and/or the calling app from which the input is received. Such an information set could include information useful to a mobile app discovery exchange. For example, such an information set could specify target apps or target app providers (e.g., advertisers) with whom the provider of the calling app (e.g., the publisher) has existing arrangements, or whom the provider of the calling app prefers. Such an information set might also specify terms (e.g., minimum payment amounts) for exposure of target apps by the calling app. Such an information set might also refer to or relate to arrangements with third parties operating in the advertising exchange. Such an information set might also include information relating to the user that could be used by the exchange to facilitate connecting advertisers with their target audiences. Such an information set might also identify mobile apps already installed on the mobile device; information that might be used by an advertiser to avoid unnecessarily exposing their mobile app to that user and the associated payment.

At least a portion of the payment made by an advertiser is directed to the publisher (e.g., payment 518 to publisher 502-1) that provides the context in which the mobile app is exposed, i.e., the provider of the calling app from which the input was received. A portion of the payment may also be directed to any of a variety of third parties 520 (e.g., payment 522 to $3^{rd}$ party 520-2) associated with exchange 500 such as, for example, the operator of the exchange, and any of a variety of entities operating within the exchange to facilitate transactions. Such entities might include, for example, consortiums of advertisers, brokers, agents, agencies, advertising networks, etc. For further information about the operation of an exchange and how payments might be directed in such an exchange please refer to U.S. Pat. No. 8,095,560 entitled Edge Attribute Aggregation in a Directed Graph issued on Jan. 10, 2012, the entire disclosure of which is incorporated herein by reference for all purposes.

It should be noted that the mobile app discovery functionality (e.g., as represented by system 516) may be integrated with and under control of the same entity as the mobile app discovery exchange (e.g., exchange 500). However, implementations are contemplated in which at least some of the various functionalities associated with each may be executed in different computing environments and/or may be operated or controlled by different entities. It should also be noted that while a cloud-based implementation of exchange 500 is contemplated, the nature of the computing environment in which exchange 400 may be implemented may vary considerably as described above with reference to the computing environment depicted in FIG. 1.

While the invention has been particularly shown and described with reference to specific embodiments thereof, it will be understood by those skilled in the art that changes in the form and details of the disclosed embodiments may be made without departing from the spirit or scope of the invention. For example, mobile app discovery techniques as described herein may facilitate sharing of information in a manner that enhances the receiving user's experience. For example, user 1 is reading an article in a mobile app on his mobile device and selects a share link to share the article with user 2. Rather than sending a browser link to user 2 (e.g., via email or SMS), selection of the link by user 1 could result in transmission of application configuration information to user 2's device for mobile apps that match the intent (e.g., read article) and results, for example, in the launch an appropriate mobile app, or provides an opportunity to download an appropriate mobile app for reading the article. The transmission of application configuration information might be triggered, for example, by providing a link to user 2 that results in a call to the mobile app discovery system, e.g., input that is mapped to the appropriate intent or information need resulting in the returned application configuration information. Alternatively, selection of the share link by user 1 could trigger the call to the mobile app discover system which, in turn, triggers transmission of the application configuration information to user 2's device.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
   maintaining a data store that relates each of a plurality of mobile applications to one or more of a plurality of information needs, and includes application configuration information for each of the plurality of mobile applications, wherein the application configuration information for each of the plurality of mobile applications identifies a mobile operating system with which the mobile application is compatible;
   with one or more computing devices, receiving input entered by a user in an interface of a mobile device;
   with the one or more computing devices, identifying a first information need of the plurality of information needs that is represented by the input;
   with the one or more computing devices, identifying a first mobile application of the plurality of mobile applications, the first mobile application corresponding to the first information need, the first mobile application having a hierarchy of pages including a home page;
   with the one or more computing devices, determining whether the first mobile application can operate on the mobile device based, at least in part, on the application configuration information for the first mobile application; and
   with the one or more computing devices, providing deep link information to the mobile device for the first mobile application, the deep link information configured to enable the mobile device to launch the first mobile application and to link to a first page within the hierarchy of the first mobile application below the home page in a manner that is responsive to the first information need represented by the input entered in the interface of the mobile device.

2. The method of claim 1, wherein the application configuration information for each of the mobile applications specifies one or more parameters to be provided to the mobile application and deep link information for the mobile application.

3. The method of claim 2, wherein the deep link information for each of the mobile applications further includes a uniform resource indicator (URL) scheme for the corresponding mobile application, and a URL template for generation of one or more deep links to the corresponding mobile application.

4. The method of claim 2, wherein the application configuration information for each of the mobile applications further includes or specifies any one or more of a human language supported by the mobile application, a category of the mobile application, payment information for the mobile application, a ranking of the mobile application, a rating of the mobile application, or a link for downloading the mobile application.

5. The method of claim 4, wherein the interface of the mobile device corresponds to a second mobile application operating on the mobile device, and wherein the payment information for each mobile application specifies a payment by a first entity associated with the mobile application to a second entity associated with the second mobile application.

6. The method of claim 1, further comprising receiving installed application information representing one or more previously installed mobile applications on the mobile device, wherein identifying the first mobile application is done with reference to the installed application information.

7. The method of claim 1, wherein identification of the first information need, identification of the first mobile application, or providing of the deep link information is done with reference to one or more actions by the user in connection with a previously filled information need.

8. A system, comprising:
   one or more data stores having data stored therein relating each of a plurality of mobile applications to one or more of a plurality of information needs, each of the mobile applications having a hierarchy of pages including a home page, the one or more data stores further including application configuration information for each of the plurality of mobile applications, the application configuration information for each mobile application specifying deep link information for the mobile application, the application configuration information for each of the mobile applications further including or specifying a mobile operating system with which the mobile application is compatible, the deep link information being configured to enable launching the corresponding mobile application and linking to one or more pages within the hierarchy of the corresponding mobile application below the corresponding home page; and
   one or more computing devices configured to implement:
   a first application programming interface (API) configured to receive input from a first mobile application operating on a mobile device, and to identify a first one of the plurality of information needs represented by the input;

resolver logic configured to identify a second mobile application corresponding to the first information need, the second mobile application being one of the plurality of mobile applications;

launcher logic configured to provide the application configuration information for the second mobile application to the mobile device;

a second API configured to receive at least some of the application configuration information for the second mobile application and determine whether the second mobile application can operate on the mobile device based, at least on part, on the application configuration information for the second mobile application;

parser logic configured to parse the deep link information for the second mobile application and to convert the deep link information to a format consumable by the second mobile application; and interstitial user interface logic configured to generate interfaces for the mobile device and to use the deep link information for the second mobile application to facilitate launching of or linking to the one or more pages within the hierarchy and below the home page of the second mobile application on the mobile device.

9. The system of claim 8, wherein the deep link information for each of the mobile applications includes a uniform resource indicator (URL) scheme for the corresponding mobile application, and a URL template for generation of one or more deep links to the corresponding mobile application.

10. The system of claim 8, wherein the application configuration information for each of the mobile applications further includes or specifies any one or more of one or more parameters to be provided to the mobile application, a human language supported by the mobile application, a category of the mobile application, payment information for the mobile application, a ranking of the mobile application, a rating of the mobile application, or a link for downloading the mobile application.

11. The system of claim 10, wherein the payment information for each mobile application specifies a payment by a first entity associated with the mobile application to a second entity associated with the first mobile application operating on the mobile device.

12. A computer-implemented method for programmatically generating application configuration information for a plurality of mobile applications, comprising:

with one or more computing devices, programmatically downloading an instance of each of the mobile applications from one of a plurality of mobile application provider platforms, each of the mobile applications having a hierarchy of pages including a home page;

with the one or more computing devices, programmatically generating deep link information for each of the mobile applications using the corresponding instance of the mobile application, the deep link information being configured to enable launching the corresponding mobile application and linking to one or more pages within the hierarchy and below the home page of the corresponding mobile application in a manner that is responsive to user input;

with the one or more computing devices, programmatically generating metadata for each of the mobile applications by scraping the metadata from the corresponding mobile application provider platform;

with the one or more computing devices, programmatically associating one or more of a plurality of information needs with each of the mobile applications based, at least in part, on the metadata for the mobile application;

with the one or more computing devices, identifying a first subset of the mobile applications corresponding to a first one of the information needs; and with the one or more computing devices, providing application configuration information for each of the first subset of the mobile applications, the application configuration information including the deep link information for each of the first subset of the mobile applications;

wherein the application configuration information for each of the mobile applications further includes or specifies a mobile operating system with which the mobile application is compatible.

13. The method of claim 12, wherein the deep link information for each of the mobile applications includes a uniform resource indicator (URL) scheme for the corresponding mobile application, and a URL template for generation of one or more deep links to the corresponding mobile application.

14. The method of claim 12, wherein the application configuration information for each of the mobile applications further includes or specifies any one or more of one or more parameters to be provided to the mobile application, a human language supported by the mobile application, a category of the mobile application, payment information for the mobile application, a ranking of the mobile application, a rating of the mobile application, or a link for downloading the mobile application.

15. The method of claim 14, wherein the first information need corresponds to input in an interface of a mobile device, wherein the interface of the mobile device corresponds to a first mobile application operating on the mobile device, and wherein the payment information for each of the first subset of mobile applications specifies a payment by a first entity associated with the corresponding mobile application to a second entity associated with the first mobile application operating on the mobile device.

16. The method of claim 12, wherein generating the metadata for at least some of the mobile applications further comprises scraping the metadata from third party web sites.

17. The method of claim 12, further comprising manually generating at least a portion of the deep link information for at least some of the mobile applications.

18. The method of claim 12, further comprising identifying the first information need with reference to input received in an interface of a mobile device.

19. The method of claim 1, wherein the application configuration information is encoded according using JavaScript Object Notation (JSON).

* * * * *